United States Patent
> Waage

[15] 3,642,047
[45] Feb. 15, 1972

[54] LAMINATED CONTAINER OF THERMOPLASTIC AND NONTHERMOPLASTIC MATERIALS WITH NIPPLES

[72] Inventor: Bard M. Waage, Knivsta, Sweden
[73] Assignee: Investrop AG, Zug, Switzerland
[22] Filed: Nov. 13, 1969
[21] Appl. No.: 876,365

[30] Foreign Application Priority Data

Nov. 21, 1968 Sweden..............................15,883/68

[52] U.S. Cl................................................150/8, 128/272
[51] Int. Cl........................................B65d 47/10, A61j 1/00
[58] Field of Search......................150/0.5, 1, 8, 12; 128/272

[56] References Cited

UNITED STATES PATENTS

| | | | |
|---|---|---|---|
| 3,108,732 | 10/1963 | Curie et al............................150/1 UX |
| 2,584,632 | 2/1952 | Southwick............................150/1 UX |
| 2,337,257 | 12/1943 | Levinston..............................150/8 X |
| 3,205,889 | 9/1965 | Alder et al............................150/8 X |
| 3,030,955 | 4/1962 | Gossett et al..........................128/272 |

*Primary Examiner*—Leonard Summer
*Attorney*—Albert M. Parker

[57] ABSTRACT

A plastic bag comprising an inner thermoplastic layer and an outer nonthermoplastic layer is disclosed having at least one connection nipple, which by means of a thermoplastic covering foil is welded to the thermoplastic inner layer of said bag so that a liquidtight connection is obtained.

3 Claims, 4 Drawing Figures

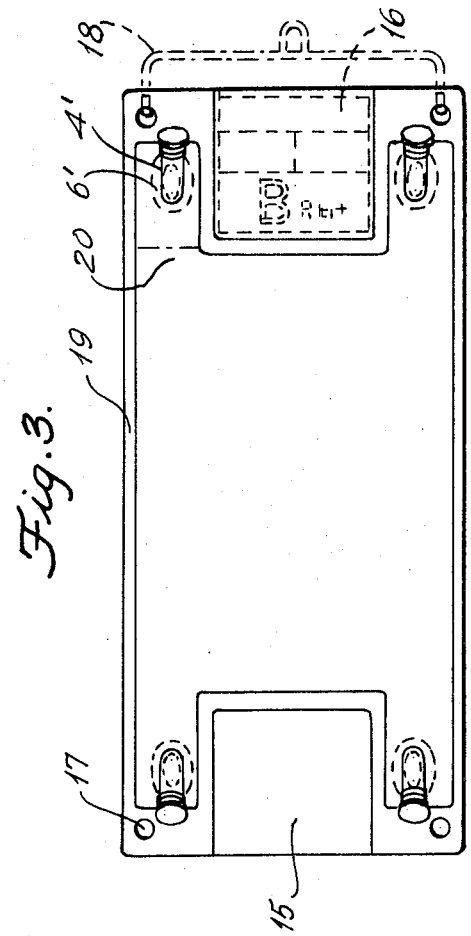
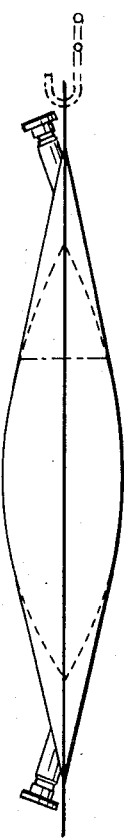
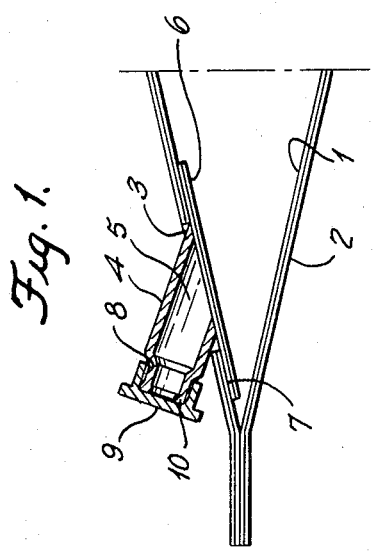
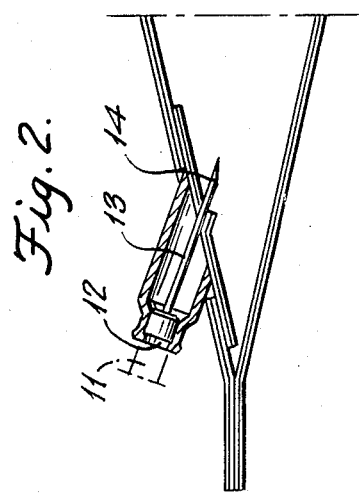

LAMINATED CONTAINER OF THERMOPLASTIC AND NONTHERMOPLASTIC MATERIALS WITH NIPPLES

The present invention relates to a baglike plastic container having at least one connection nipple attached in a liquidtight manner, the container being manufactured from laminated plastic having an inner thermoplastic layer and an outer nonthermoplastic layer and a method of attaching such connection nipples.

In many fields, particularly medical care, baglike plastic containers are used to an ever increasing extent. Because of the rapid development in the field of plastics it is now possible to manufacture relatively thin laminated plastic which fulfills the specific requirements for each particular case. Apart from the fact that is must be possible to weld together such plastic containers, it is also a requirement that the material of the container does not affect the contents, for example in such cases when the containers are to be used for medical purposes, for example for storing blood or organic tissue, for storing and administering medicinal preparations such as infusion solutions or the like. At the same time, the outside of the container must give sufficient protection against damage from the exterior, and the material should also be somewhat translucent. Finally, such container material should be able to withstand considerable variations in temperature, i.e., both a sterilization temperature of about 200° C. and a temperature of −200° C. if the product is to be deep-frozen in, for example, liquid nitrogen.

It has been found suitable for this purpose to use container material consisting of laminated plastic having an inner thermoplastic layer and an outer nonthermoplastic layer. The difficulty has previously been with such containers that it has been impossible in a satisfactory way to supply baglike containers manufactured from such materials with liquidtight connection nipples. This is of particular importance for containers primarily intended for storing the contents and then also acting as, for example, an infusion unit. It is in this case necessary for a rapid and tight cannular connection to be effected, while still maintaining sterile conditions. Such a connection must also be absolutely tight during storage of the container and it should preferably be possible to keep the connection sterile until it is to be used so that a sterile cannular tube can be attached to the connection in a satisfactory way from the sterility point of view. Furthermore, it should also be possible to reseal the container after some of the contents have been removed so that the container can be stored until the next time it is to be used.

It has now proved possible to fulfil the requirements stated above by means of the present invention and substantially characteristic of the invention is that the connection nipple consisting of a thermoplastic material is welded to a thermoplastic covering foil covering an opening in the container and welded to the inner thermoplastic layer of the container material inside the container around said opening.

The connection nipple is suitably inclined with respect to the covering foil, its end part situated near the covering foil being correspondingly inclined.

A liquidtight attachment to the container material is thus achieved which does not, however, communicate with the inside of the container since the covering foil is sealed around the opening inside the bag and is also sealed to the open end of the connection nipple, thus acting as a membrane in the connection nipple.

In order to guarantee that the inner surface of the connection nipple remains sterile during storage, the open end of the connection nipple is provided with a snap-on lid of a type known per se. This means that when such a container is sterilized, the inside of the connection nipple is also sterilized and this sterility is maintained up to the moment of use. The lid is then removed and a sterile cannular tube inserted in the connection nipple, puncturing the covering foil and then communicating with the contents.

Since the inner sides of the container material facing each other consist of a thermoplastic material and can thus easily be welded together, it is possible after using a certain amount of the contents to reseal the container in such a way that the previously used connection nipple is situated outside the container space itself. In order to be able to repeat the process at a later date the container should preferably in such cases be provided with several such nipples, for example located at the corners of the container so that these can easily be sealed from the actual container space.

With the method proposed according to the invention for attaching such connection nipples an opening is first made in the container material and this opening is then covered from the inside of the container with a covering foil having somewhat greater dimensions than said opening, after which the covering foil which either consists entirely of a thermoplastic material or at least has a thermoplastic layer on the side facing the container material, is welded to the inner thermoplastic layer of the container material around the opening, after which the connection nipple consisting of an open, tubular body of a thermoplastic material, is welded to the thermoplastic surface of the foil covering the opening.

In the following the invention will be described with reference to the accompanying drawings, where FIG. 1 shows a connection nipple according to the invention applied on a container, FIG. 2 the nipple according to FIG. 1 connected to a cannular tube, FIG. 3 a plastic container provided with four such connection nipples, seen from above, and FIG. 4 a side view of the container shown in FIG. 3.

FIGS. 1 and 2 show part of a container manufactured from laminated plastic and comprising an inner layer 1 of thermoplastic material and an outer layer 2 of nonthermoplastic material. Since the thermoplastic layers face each other the container can easily be welded together along its edges. The inner, thermoplastic layer 1 of the laminated plastic may consist, for example, of fluorinated ethylene propylene and the outer nonthermoplastic layer 2, for example, of polyimide. The production and characteristics of a polyimide film are described in the article "H-Film— A New High Temperature Dielectric" by Leonard E. Amborski, *I&EC Product Research and Development*, vol. 2, No. 3, Sept. 1963, pp. 198–193. As can be seen from the drawings, there is a hole 3 in one wall of the container and a connection nipple 4 having substantially circular cross section and oblique lower part 5 is inserted in this opening 3 and welded to a plastic foil 6 covering this opening from the inside. In the embodiment shown in the drawings this covering foil 6 consists of the same laminated plastic as the rest of the container material, but its thermoplastic layer 7 faces the inner thermoplastic layer 1 of the container and is welded to this around the opening 3. Of course it is also possible to use a plastic material for the covering foil which consists entirely of a thermoplastic material. The connection nipple 4 is also made of a thermoplastic material so that the end part 5 can be welded to the covering foil 6. In this way it is ensured that the covering foil 6 is sealed to the connection nipple 4 and also that it is sealed to the inside of the container around the opening 3, in addition closing the lower end 5 of the attachment nipple 4. The opposite end of the attachment nipple finishes in a flange 8 which has a removable lid 9. Inside the flange 8 are a number of projections 10 directed radially inwards and arranged to cooperate with a groove 12 in a cannular attachment 11 to fix the position of a cannular tube 13 in the flange 8, as seen in FIG. 2. The length of the cannular tube should be such that the covering foil 6 at the bottom of the connection nipple 4 is perforated by the cannular tube without the point 14 also penetrating through the opposite side of the container. Thus, instead of the cannular tube shown in the drawings, it is preferable to use plastic cannular tubes for transfusion, known per se, with an angled point, for instance.

FIGS. 3 and 4 show a suitable arrangement of such connection nipples in a container intended for storage, deep-freezing and administering blood-transfusions. The container shown in FIGS. 3 and 4 is suitably manufactured of the same container material as that in FIGS. 1 and 2 and has four connection nipples placed one in each corner of the container. The container is in this case also provided with pockets 15 on the outside into which identification slips 16 can be inserted. The container is also provided on its short sides with holes 17 for a hanging means in the form of a yoke 18. The container is welded together along an outer welded seam 19 by which the pockets 15 are also separated from the inside of the container. It is clear from the embodiment shown in FIGS. 3 and 4 that, if necessary, it is easy to seal the container again after some of the contents of the container have been removed. For example, a weld may be made between an outer edge of the container and the lower edge of the pocket 15, as shown by the broken line 20. In this way the connection nipple 4' is effectively separated from the contents of the container when the contents has been partially removed through the connection nipple 4'.

I claim:

1. A baglike plastic container having at least one connection nipple attached thereto in a liquidtight manner, the container being manufactured from laminated plastic having an inner thermoplastic layer and an outer nonthermoplastic layer, wherein said connection nipple is of thermoplastic material, an inner end of said nipple being welded to a thermoplastic covering foil which covers an opening in the container; said covering foil being welded to the inner thermoplastic layer of the container material inside the container around said opening; and wherein the connection nipple is inclined with respect to said covering foil, the inner end of said nipple having a corresponding inclination where it is welded to said covering foil; an outer end of the connection nipple opposite the end welded to the covering foil having an opening flange with a removable lid.

2. Container according to claim 1, wherein said opening flange has a number of projections directed inwardly and arranged to snap into a corresponding groove in a cannular attachment for insertion of the attachment into the flange when said removable lid has been removed.

3. Container according to claim 1, wherein the container is provided with a plurality of connection nipples.

* * * * *